(12) United States Patent
McKinnon et al.

(10) Patent No.: US 11,828,536 B2
(45) Date of Patent: Nov. 28, 2023

(54) HEAT TRANSFER ASSEMBLIES WITH COMPLIANT HEAT PIPES

(71) Applicant: LOCKHEED MARTIN CORPORATION, Bethesda, MD (US)

(72) Inventors: Douglas V. McKinnon, Lone Tree, CO (US); Jay H. Ambrose, Santa Cruz, CA (US); Spencer K. Connor, Littleton, CO (US); Bronson Murray, Littleton, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 475 days.

(21) Appl. No.: 16/843,801

(22) Filed: Apr. 8, 2020

(65) Prior Publication Data

US 2021/0318074 A1   Oct. 14, 2021

(51) Int. Cl.
*F28D 15/02* (2006.01)
*B64G 1/50* (2006.01)

(52) U.S. Cl.
CPC ......... *F28D 15/0241* (2013.01); *B64G 1/503* (2013.01); *B64G 1/506* (2013.01); *F28D 15/0275* (2013.01)

(58) Field of Classification Search
CPC . F28D 15/0275; F28D 15/0241; B64G 1/506; B64G 1/503
USPC ...................................................... 244/171.8
See application file for complete search history.

(56) References Cited

U.S. PATENT DOCUMENTS

| | | | | |
|---|---|---|---|---|
| 5,027,892 A | * | 7/1991 | Bannon | B64G 1/503 244/172.6 |
| 5,036,905 A | * | 8/1991 | Eninger | B64G 1/506 244/172.6 |
| 8,714,492 B2 | * | 5/2014 | Goodzeit | B64G 1/503 244/171.8 |
| 8,960,608 B2 | * | 2/2015 | Goodzeit | B64G 1/222 244/171.8 |
| 9,315,280 B2 | | 4/2016 | Ambrose et al. | |
| 10,184,729 B2 | * | 1/2019 | Inagaki | F28D 15/0241 |
| 10,595,439 B2 | * | 3/2020 | Shia | H01L 23/427 |
| 2011/0220328 A1 | * | 9/2011 | Huang | F28D 15/046 29/890.032 |
| 2018/0031329 A1 | * | 2/2018 | Wang | G06F 1/203 |
| 2020/0223565 A1 | * | 7/2020 | Ambrose | F28D 15/04 |
| 2021/0382532 A1 | * | 12/2021 | Nicholas | G06F 1/1656 |
| 2022/0260321 A1 | * | 8/2022 | Liu | F28D 15/0241 |

* cited by examiner

*Primary Examiner* — Jon T. Schermerhorn, Jr.
(74) *Attorney, Agent, or Firm* — BAKERHOSTETLER (57) ABSTRACT

A panel assembly for use with a spacecraft includes a payload, a radiator panel and a heat pipe. The payload is configured to generate waste heat during operation. The radiator panel is spaced apart from the payload and is configured to dissipate waste heat. The heat pipe is coupled to the payload and the radiator panel. The heat pipe includes a compliant portion to permit the radiator panel to move relative to the payload. Further the heat pipe is configured to transfer waste heat from the payload to the radiator panel.

14 Claims, 11 Drawing Sheets

HEAT TRANSFER ASSEMBLIES WITH COMPLIANT HEAT PIPES

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND

Field

The present description relates in general to heat transfer assemblies, and in particular to, for example, without limitation, heat transfer assemblies with compliant portions.

Description of the Related Art

The description provided in the background section should not be assumed to be prior art merely because it is mentioned in or associated with the background section. The background section may include information that describes one or more aspects of the subject technology.

Satellites can deploy payloads to perform functions, such as facilitate communication. During operation, the payloads can generate significant amounts of heat (in excess of 300 watts) that is dissipated by thermal radiators. Payloads can be mounted directly on thermal radiators to dissipate the heat generated by the payloads.

In some applications, payloads are spaced apart from the thermal radiators. However, various challenges can arise when utilizing high power payloads that are spaced apart from the thermal radiators.

It would be advantageous to have heat transfer assemblies that can allow for the effective dissipation of heat while permitting the payload to be spaced apart from the thermal radiator.

SUMMARY

The subject technology is illustrated, for example, according to various aspects described below.

According to some embodiments, a panel assembly for use with a spacecraft can include a payload configured to generate waste heat during operation; a radiator panel spaced apart from the payload, wherein the radiator panel is configured to dissipate waste heat; and a heat pipe coupled to the payload and the radiator panel, the heat pipe comprising a compliant portion to permit the radiator panel to move relative to the payload, wherein the heat pipe is configured to transfer waste heat from the payload to the radiator panel.

Optionally, the heat pipe includes a payload portion coupled to the payload and a radiator portion coupled to the radiator panel, and the compliant portion is disposed between the payload portion and the radiator portion.

In some embodiments, the compliant portion includes a flexible joint configured to permit the radiator portion to move relative to the payload portion.

In some embodiments, the compliant portion includes a looped portion configured to permit the radiator portion to move relative to the payload portion. The looped portion can define a helical shape between the radiator portion and the payload portion.

Optionally, the radiator panel can include a plurality of radiator panels. In some applications, each radiator panel of the plurality of radiator panels is movably coupled to a baseplate. The heat pipe can be coupled to each radiator panel of the plurality of radiator panels and the heat pipe transfers heat between the plurality of radiator panels. Optionally, the heat pipe includes a plurality of heat pipes.

In some applications, a first heat pipe of the plurality of heat pipes is coupled to the payload and a first radiator panel of the plurality of radiator panels, and a second heat pipe of the plurality of heat pipes is coupled to the payload and a second radiator panel of the plurality of radiator panels. The first heat pipe can be in thermal communication with the second heat pipe to transfer heat between the first radiator panel and the second radiator panel.

In some applications, the payload includes an electronically steered antenna or a direct radiating array.

According to some embodiments, a spacecraft includes an electronically steered antenna configured to generate waste heat during operation; and a panel assembly, including a plurality of radiator panels spaced apart from the electronically steered antenna, wherein the plurality of radiator panels are configured to dissipate waste heat from the electronically steered antenna; and at least one heat pipe coupled to the electronically steered antenna and the plurality of radiator panels, the at least one heat pipe comprising a compliant portion to permit the radiator panel to move relative to the electronically steered antenna, wherein the at least one heat pipe is configured to transfer waste heat from the electronically steered antenna to the plurality of radiator panels.

Optionally, the at least one heat pipe transfers heat between the plurality of radiator panels.

In some embodiments, the at least one heat pipe comprises a plurality of heat pipes, wherein each heat pipe of the plurality of heat pipes is coupled to the electronically steered antenna and a respective radiator panel of the plurality of radiator panels. Each heat pipe of the plurality of heat pipes can transfer heat to other heat pipes of the plurality of heat pipes.

According to some embodiments a method includes operating a payload and generating waste heat; transferring waste heat from the payload to a radiator panel via a heat pipe coupled to the payload and the radiator panel; moving the radiator panel relative to the payload by bending a compliant portion of the heat pipe; and dissipating waste heat from the payload via the radiator panel.

Optionally, the radiator panel includes a plurality of radiator panels. The method can further include transferring heat from a first radiator panel of the plurality of radiator panels to a second radiator panel of the plurality of radiator panels.

Optionally, the method can further include transferring heat from the first radiator panel to the second radiator panel via the heat pipe.

In some embodiments, the heat pipe includes a plurality of heat pipes. The method can further include transferring heat from the first radiator panel to a first heat pipe of the plurality of heat pipes; transferring heat from the first heat pipe of the plurality of heat pipes to a second heat pipe of the plurality of heat pipes; and transferring heat from the second heat pipe to the second radiator panel.

In the following description, specific embodiments are described to shown by way of illustration how the invention may be practiced. It is to be understood that other embodiments may be utilized and changes may be made without departing from the scope of the present invention.

DETAILED DESCRIPTION

Figure 1:
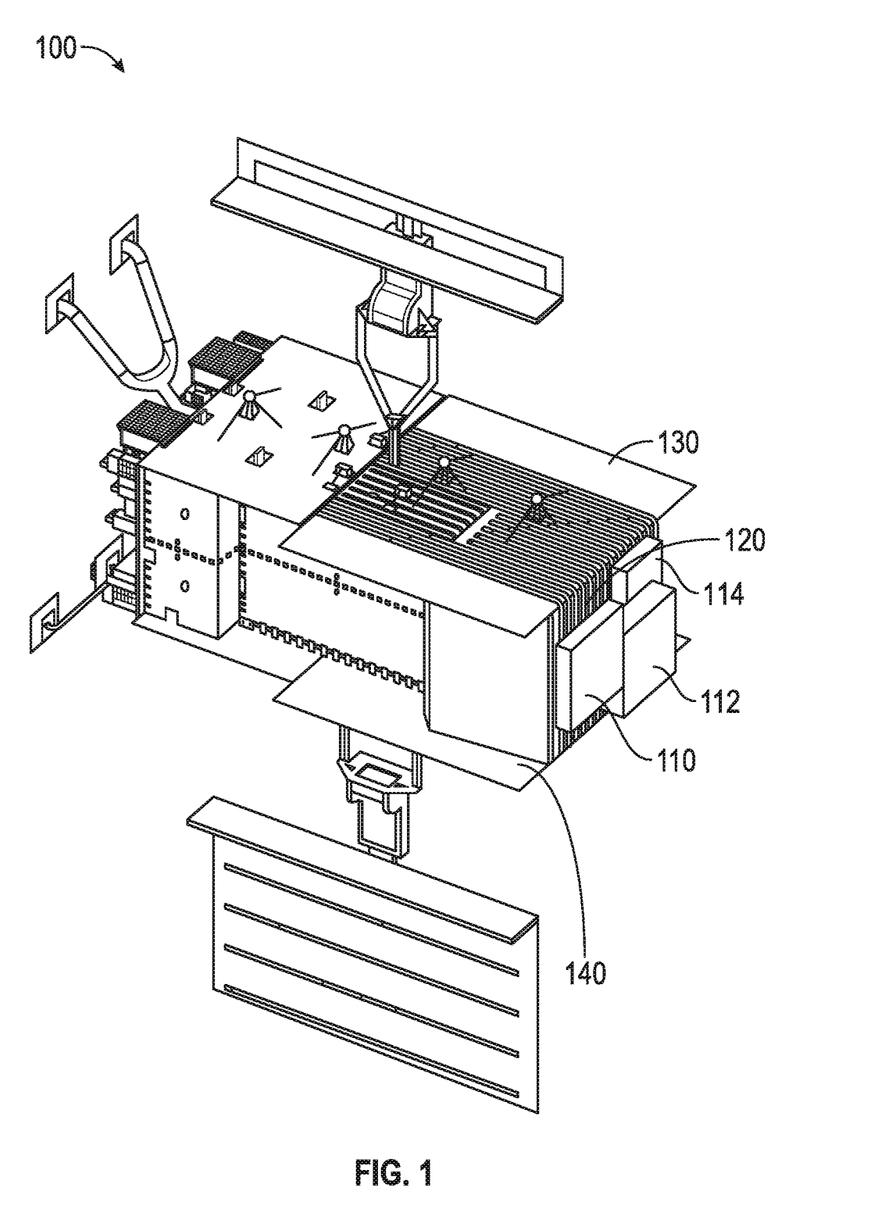
FIG. 1 illustrates perspective view of a satellite, according to some embodiments of the present disclosure.

FIG. 1 illustrates perspective view of a satellite 100, according to some embodiments of the present disclosure. In the depicted example, the satellite 100 allows for the deployment and operation of payloads 110, 112, 114 in space. As can be appreciated, the term "payload" can refer to a payload or a heat source in the context of this disclosure.

In some applications, the payloads 110, 112, 114 can facilitate communication to and from the satellite 100. During operation, the payloads 110, 112, 114 can generate waste heat that is dissipated by the satellite 100. The payloads 110, 112, 114 can include Direct Radiating Antennas (DRA), Electronically Steered Antennas (ESA) and/or Active Phased Arrays (APA). As can be appreciated, certain payloads 110, 112, 114 may generate and require dissipation of high amounts of heat (in excess of 300 watts).

In some embodiments, certain payloads 110, 112, 114, including, but not limited to DRA, ESA, and/or APA payloads may require a nadir field of view for operation. Therefore, in some applications, certain payloads 110, 112, 114 can be mounted on earth facing panels (e.g. an earth deck 120) of the satellite 100. As can be appreciated, by mounting the payloads 110, 112, 114 on an earth facing panel, the payloads 110, 112, 114 are spaced apart from the north radiator panel 130 and the south radiator panel 140 that are utilized to dissipate heat from the payloads 110, 112, 114. In contrast, certain conventional communication payload architectures can provide discrete electronics units that are mounted directly on the radiator panels of the satellite. As can be appreciated, the teachings described herein can be utilized on satellites in earth orbit, satellites in other orbits with inclinations greater than zero degrees and/or with non-earth facing satellite panels. Further, teachings herein can be applied to space vehicles that do not orbit the earth, such as interplanetary probes or spacecraft that orbit the sun, other planets, or are positioned at Lagrange points. Therefore, the terms "earth deck," "north radiator panel," and/or "south radiator panel" can be changed as needed.

In the depicted example, the heat generated by the payloads 110, 112, 114 can be dissipated by a north radiator panel 130 and/or a south radiator panel 140. During operation the north radiator panel 130 and/or the south radiator panel 140 can reject heat from the payloads 110, 112, 114 into the environment.

As illustrated, the north radiator panel 130 and/or the south radiator panel 140 can extend from the satellite 100 to provide radiation surfaces for the satellite 100. The north radiator panel 130 and/or the south radiator panel 140 can be coupled to the earth deck 120. Optionally, the north radiator panel 130 and/or the south radiator panel 140 can be hinged to the earth deck 120. In some applications, the north radiator panel 130 and/or the south radiator panel 140 can include Loop Heat Pipe (LHP) and Deployed Thermal Radiator (DTR) based, or equivalent, thermal transport systems.

During operation, one or more heat pipes can transfer waste heat from the payloads 110, 112, 114 to the north radiator panel 130 and/or the south radiator panel 140. Heat pipes can utilize principles of thermal conductivity and phase transitions to transfer heat between the payloads 110, 112, 114 and the north radiator panel 130 and/or the south radiator panel 140. As described herein, the heat pipes of the satellite 100 can include a compliant or flexible portion to allow the heat pipes to be movable. Advantageously, the configuration of the heat pipes can permit effective heat transfer paths between the payloads 110, 112, 114 and the heat pipes and between the heat pipes and the north radiator panel 130 and/or the south radiator panel 140.

Advantageously, by utilizing heat pipes with compliant or flexible portions, heat transfer assemblies can avoid thermal joints with a large degree of bond line thickness variability, which would result in low thermal performance that may not adequately dissipate heat from payloads 110, 112, 114 such as DRA, ESA, and/or APA payloads.

As illustrated, the satellite 100 can include multiple radiator panels, for example, the north radiator panel 130 and the south radiator panel 140. As can be appreciated, satellites 100 that are placed in geostationary orbit with continuous heat pipes running between the panels can utilize a north facing north radiator panel 130 and a south facing south radiator panel 140 to minimize the impact of seasonally varying solar load and thereby maximize the satellite 100's total thermal capacity.

In some embodiments, heat can be transferred between the north radiator panel 130 and the south radiator panel 140 to efficiently distribute thermal dissipation capacity of the radiator panels 130, 140. As can be appreciated, heat can be transferred between the north radiator panel 130 and the south radiator panel 140 based on the positioning of the satellite 100 and the efficiency and/or capacity of the north radiator panel 130 and the south radiator panel 140. As described herein, heat pipes can facilitate the transfer of heat between the north radiator panel 130 and the south radiator panel 140.

Figure 2A:
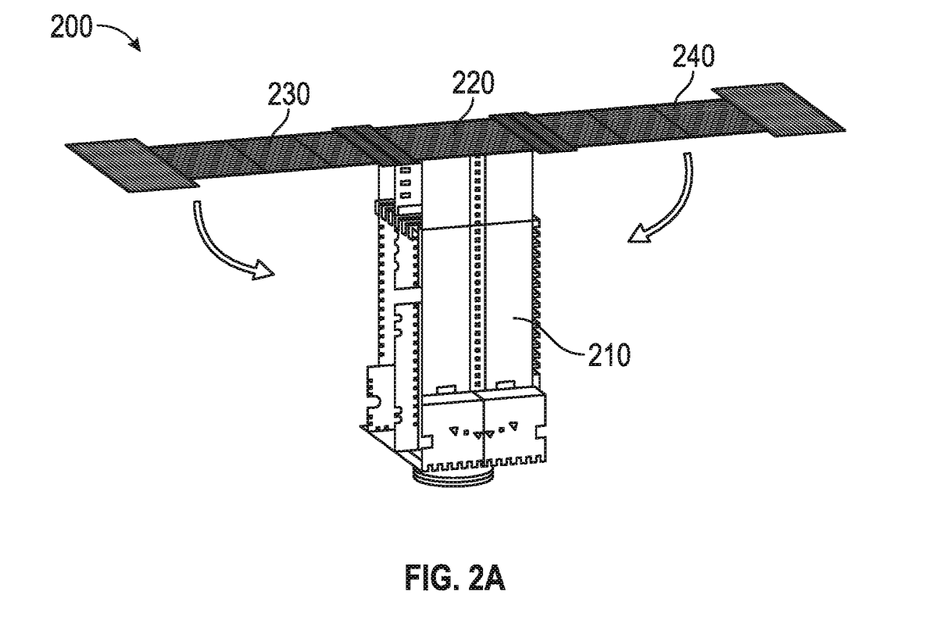
FIG. 2A illustrates a perspective view of a satellite, according to some embodiments of the present disclosure.
Figure 2B:
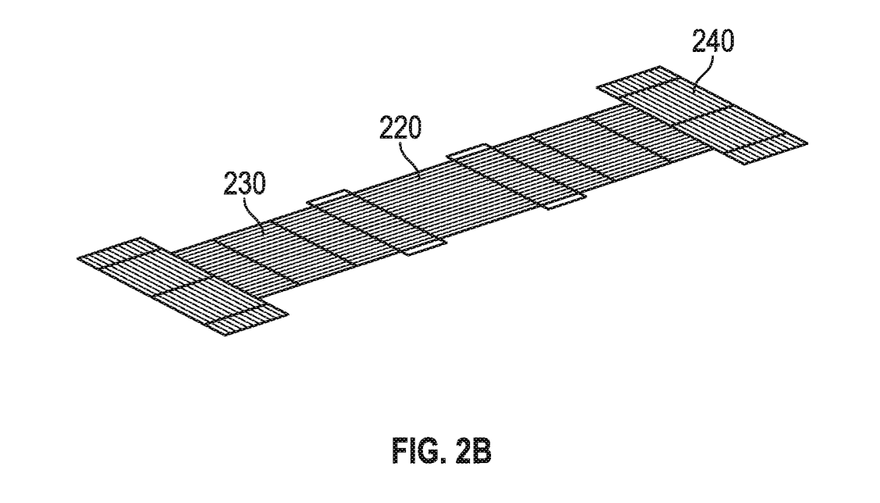
FIG. 2B illustrates a perspective view of a panel assembly of the satellite of FIG. 2A, according to some embodiments of the present disclosure.

FIG. 2A illustrates a perspective view of a satellite 200, according to some embodiments of the present disclosure. FIG. 2B illustrates a perspective view of a panel assembly of the satellite 200 of FIG. 2A, according to some embodiments of the present disclosure. In the depicted example, the satellite 200 depicts features that are similar to the features of satellite 100. Therefore, similar features of satellite 200 are identified with reference numerals that similar to the reference numerals that are used for features of satellite 100.

In some applications, the movable north radiator panel 230 and the movable south radiator panel 240 are movable between a pre-launch configuration and a flight configuration. As illustrated, the movable north radiator panel 230 and the movable south radiator panel 240 can extend away from the satellite 200 in the pre-launch configuration to facilitate assembly of the panels to the satellite core. In a flight configuration, the movable north radiator panel 230 and the movable south radiator panel 240 can be folded toward or wrapped around the satellite 200 body.

Figure 3A:
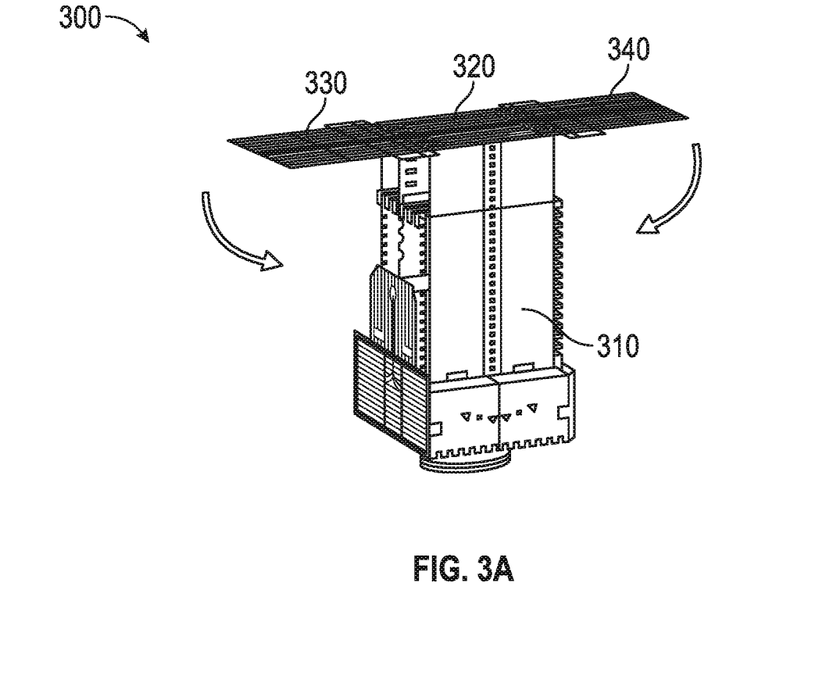
FIG. 3A illustrates a perspective view of a satellite, according to some embodiments of the present disclosure.
Figure 3B:
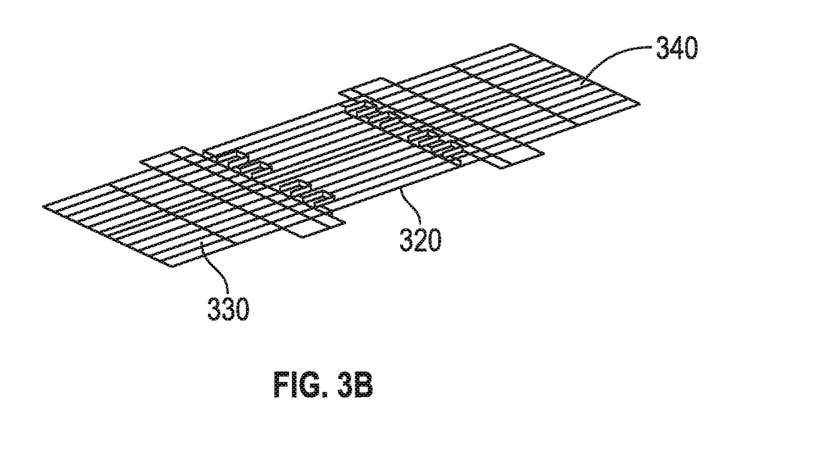
FIG. 3B illustrates a perspective view of a panel assembly of the satellite of FIG. 3A, according to some embodiments of the present disclosure.

FIG. 3A illustrates a perspective view of a satellite 300, according to some embodiments of the present disclosure. FIG. 3B illustrates a perspective view of a panel assembly of the satellite 300 of FIG. 3A, according to some embodiments of the present disclosure. In the depicted example, the satellite 300 comprises a split transponder configuration. In the depicted example, the satellite 300 depicts features that are similar to the features of satellite 100. Therefore, similar features of satellite 300 are identified with reference numerals that similar to the reference numerals that are used for features of satellite 200.

Figure 4A:
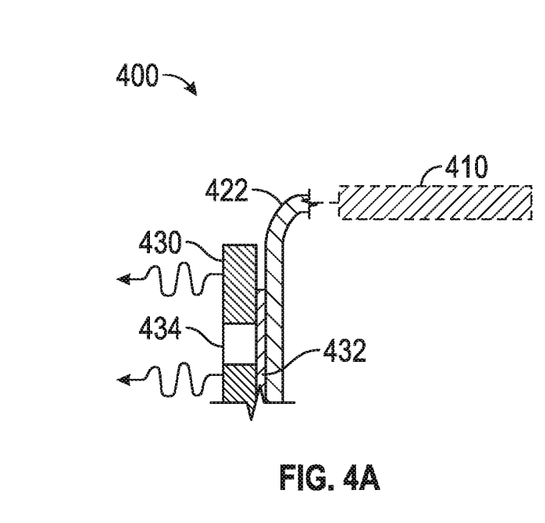
FIG. 4A is a partial cross-sectional view of a panel assembly, according to some embodiments of the present disclosure.

FIG. 4A is a partial cross-sectional view of a panel assembly 400, according to some embodiments of the present disclosure. In the depicted example, the panel assembly 400 allows for waste heat from the heat pipe 410 to be transferred to the radiator panel 430 to allow the waste heat to be dissipated.

As illustrated, a heat pipe 410 transfers waste heat from the payload to the radiator panel 430.

In some embodiments, the heat pipe 410 is coupled to the radiator panel 430 to allow heat transfer between the heat pipe 410 and the radiator panel 430. The heat pipe 410 can be affixed to an outer surface of the radiator panel 430. As illustrated, the heat pipe 410 can be coupled to an interface 432 disposed between the heat pipe 410 and the radiator panel 430. The interface 432 can be a flanged or bolted interface. Advantageously, the interface 432 can increase surface contact between the heat pipe 410 and the radiator panel 430 to increase heat transfer between the radiator panel 430 and the heat pipe 410. Heat can be transferred between the heat pipe 410 and the radiator panel 430 through conduction and/or radiation.

Optionally, the radiator panel 430 can have a honeycomb structure. The radiator panel 430 can include thermally conductive elements 434 to facilitate thermal transfer from the heat pipe 410 across the thickness of the radiator panel 430. The thermally conductive elements 434 can include thermally conductive slugs.

As can be appreciated, the heat pipe 410 can include a compliant portion 422 to allows the heat pipe 410 to move as needed. Advantageously, the compliant portion 422 can allow the heat pipe 410 to be moved into position during the assembly of the panel assembly 400. For example, the compliant portion 422 can be flexed or otherwise moved to permit the heat pipe 410 to make increased surface contact with the heat pipe 410 and/or the radiator panel 430, increasing heat transfer between the heat pipe 410 and the heat pipe 410 and/or the radiator panel 430.

Figure 4B:
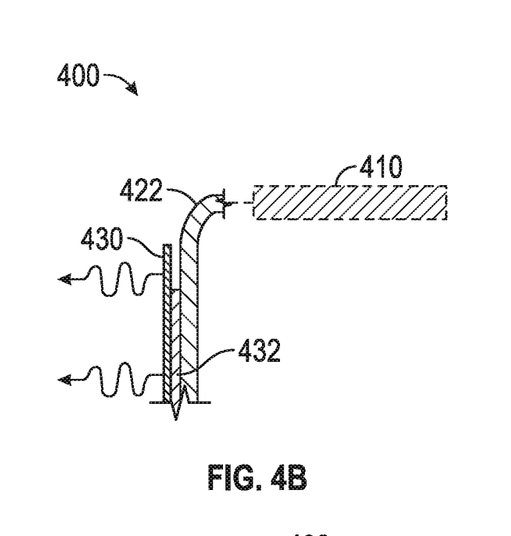
FIG. 4B is a partial cross-sectional view of a panel assembly, according to some embodiments of the present disclosure.

FIG. 4B is a partial cross-sectional view of a panel assembly 400, according to some embodiments of the present disclosure. In the depicted example, the panel assembly 400 of FIG. 4B depicts features that are similar to the features of panel assembly 400 of FIG. 4A. Therefore, similar features of panel assembly 400 of FIG. 4B are identified with reference numerals that similar to the reference numerals that are used for features of panel assembly 400 of FIG. 4A. In the depicted example, the radiator panel 430 can have a sheet metal or machined panel construction.

Figure 4C:
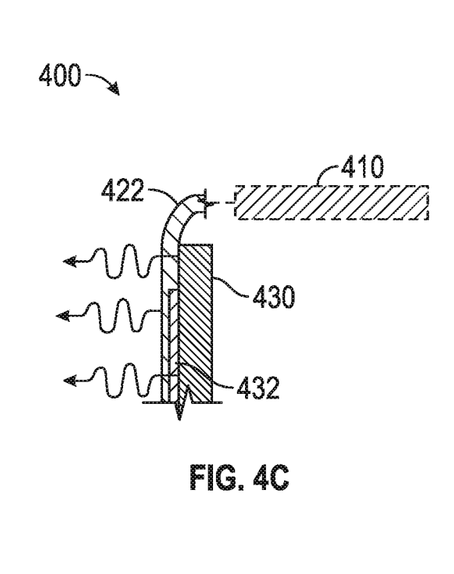
FIG. 4C is a partial cross-sectional view of a panel assembly, according to some embodiments of the present disclosure.

FIG. 4C is a partial cross-sectional view of a panel assembly 400, according to some embodiments of the present disclosure. In the depicted example, the panel assembly 400 of FIG. 4C depicts features that are similar to the features of panel assembly 400 of FIG. 4A. Therefore, similar features of panel assembly 400 of FIG. 4C are identified with reference numerals that similar to the reference numerals that are used for features of panel assembly 400 of FIG. 4A. In the depicted example, the radiator panel 430 be mounted internally relative to the heat pipe 410. As illustrated, the heat pipe can be coupled to an interface 432 disposed or embedded within the heat pipe 320. The interface 432 can be a bolted flange. Heat may radiate from the radiator panel 430 and/or the heat pipe 410 directly.

Figure 4D:
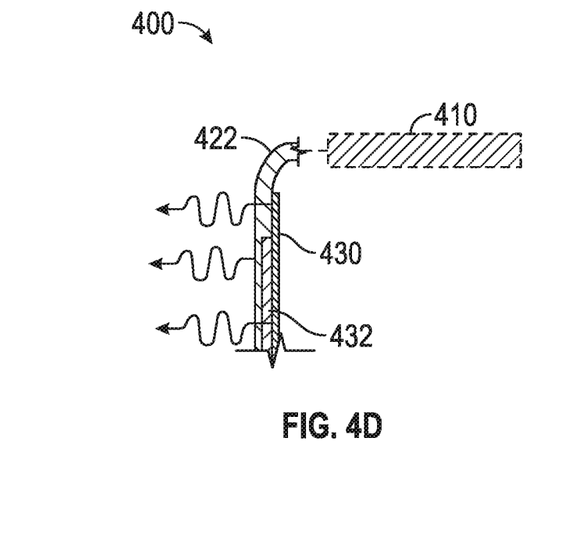
FIG. 4D is a partial cross-sectional view of a panel assembly, according to some embodiments of the present disclosure.

FIG. 4D is a partial cross-sectional view of a panel assembly 400, according to some embodiments of the present disclosure. In the depicted example, the panel assembly 400 of FIG. 4D depicts features that are similar to the features of panel assembly 400 of FIG. 4C. Therefore, similar features of panel assembly 400 of FIG. 4D are identified with reference numerals that similar to the reference numerals that are used for features of panel assembly 400 of FIG. 4C. In the depicted example, the radiator panel 430 can have a sheet metal or machined panel construction. In some embodiments, the radiator panel 430 can be affixed to the heat pipe 410 by adhesives, fasteners, and/or welding (including plug welds).

Figure 4E:
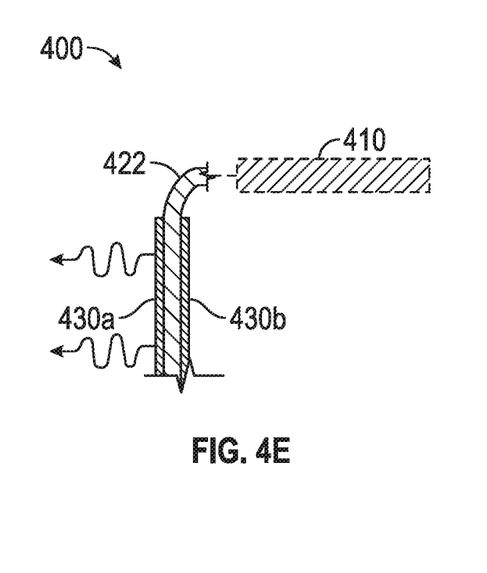
FIG. 4E is a partial cross-sectional view of a panel assembly, according to some embodiments of the present disclosure.

FIG. 4E is a partial cross-sectional view of a panel assembly 400, according to some embodiments of the present disclosure. In the depicted example, the panel assembly 400 of FIG. 4E depicts features that are similar to the features of panel assembly 400 of FIG. 4A. Therefore, similar features of panel assembly 400 of FIG. 4E are identified with reference numerals that similar to the reference numerals that are used for features of panel assembly 400 of FIG. 4A. In the depicted example, the heat pipe 410 is embedded within the honeycomb structure of the radiator panel 430a, 430b. In some embodiments, the heat pipe 410 is embedded between a first face sheet 430a and a second face sheet 430b of the radiator panel. Heat from the heat pipe 410 can be transmitted from the interior to the exterior surfaces of the radiator panel 430 to allow the heat from the heat pipe 410 to be rejected.

Figure 5A:
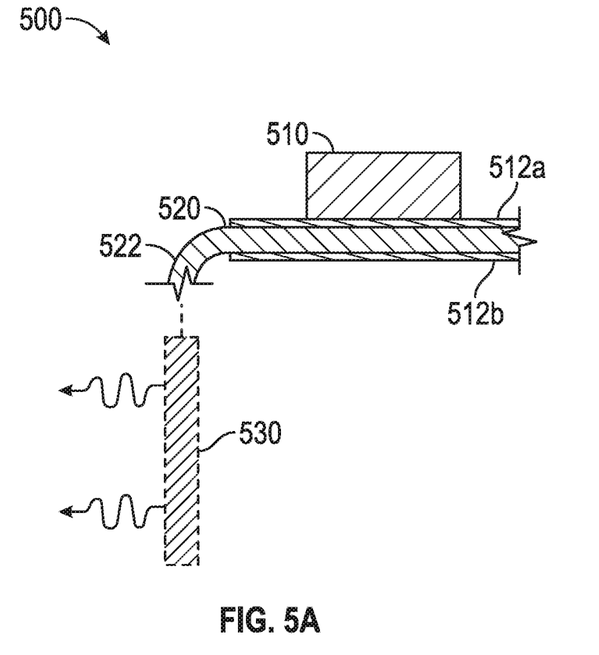
FIG. 5A is a partial cross-sectional view of a panel assembly, according to some embodiments of the present disclosure.

FIG. 5A is a partial cross-sectional view of a panel assembly 500, according to some embodiments of the present disclosure. In the depicted example, the panel assembly 500 depicts features that are similar to the features of panel assembly 400 of FIG. 4A. Therefore, similar features of panel assembly 500 are identified with reference numerals that similar to the reference numerals that are used for features of panel assembly 400 of FIG. 4A.

Similar to panel assembly 400, a heat pipe 520 is coupled to a payload 510 to allow heat transfer between the heat pipe 520 and the payload 510. In the depicted example, the payload 510 is coupled to a face sheet 512a, 512b. As illustrated, the face sheets 512a, 512b can include an upper face sheet 512a and a lower face sheet 512b.

In the depicted example, the heat pipe 520 is coupled to the face sheet 512a, 512b. As illustrated, the heat pipe 520 can be embedded between the upper face sheet 512a and the lower face sheet 512b. As can be appreciated, heat can be transferred from the payload 510 to the heat pipe 520 through a portion of the panel thickness of the face sheet 512a, 512b.

Figure 5B:
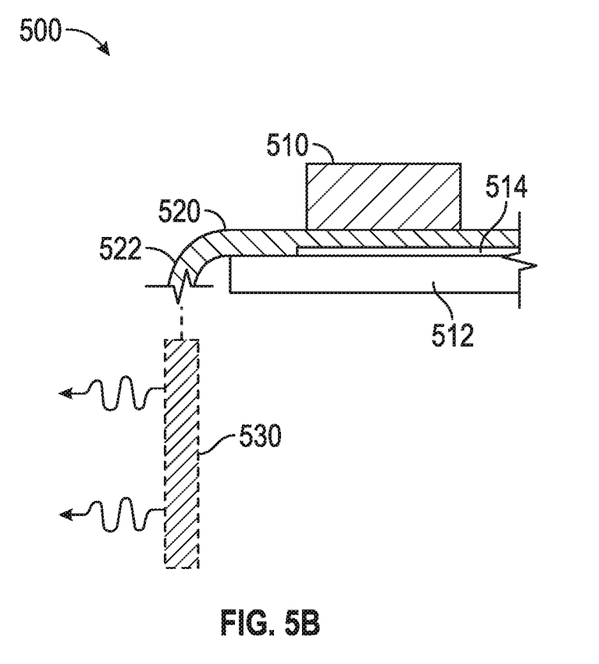
FIG. 5B is a partial cross-sectional view of a panel assembly, according to some embodiments of the present disclosure.

FIG. 5B is a partial cross-sectional view of a panel assembly 500, according to some embodiments of the present disclosure. In the depicted example, the panel assembly 500 of FIG. 5B depicts features that are similar to the features of panel assembly 500 of FIG. 5A. Therefore, similar features of panel assembly 500 of FIG. 5B are identified with reference numerals that similar to the reference numerals that are used for features of panel assembly 500 of FIG. 5A.

In the depicted example, the heat pipe 520 can be coupled to the exterior surface of a payload panel 512. The heat pipe 520 can be mounted to the payload panel 512 by a flange 514. The flange 514 can be a bolted flange.

As illustrated, the payload 510 can be directly secured to the heat pipe 520 to permit heat to be conducted from the payload 510 to the heat pipe 520. Optionally, the payload 510 can be further secured to the payload panel 512. In some embodiments, the payload 510 can be secured to payload panel 512 via structural mounts interspaced between the heat pipes 520.

Figure 6A:
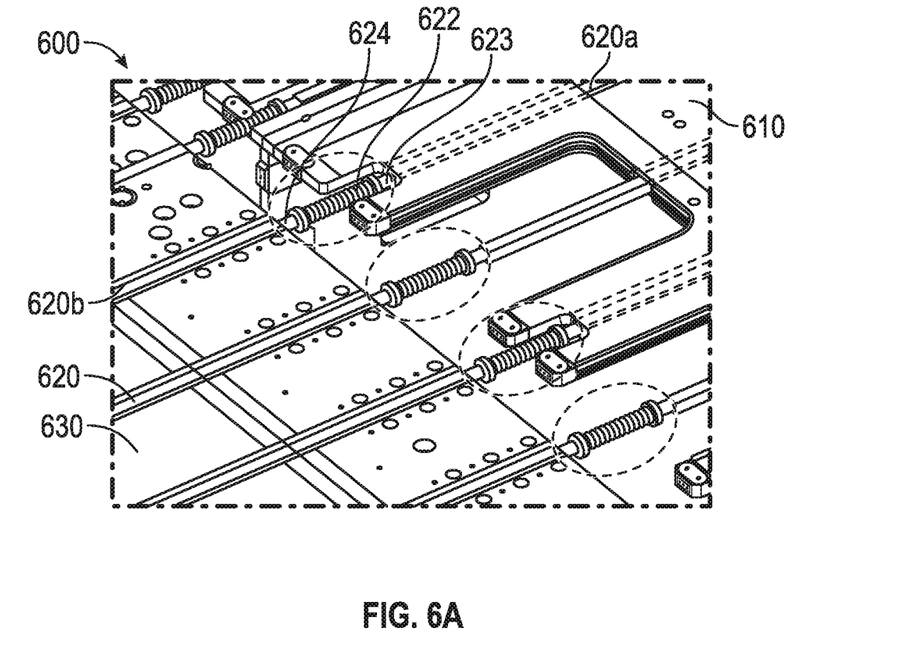
FIG. 6A is a perspective view of a panel assembly in a flat configuration, according to some embodiments of the present disclosure.
Figure 6B:
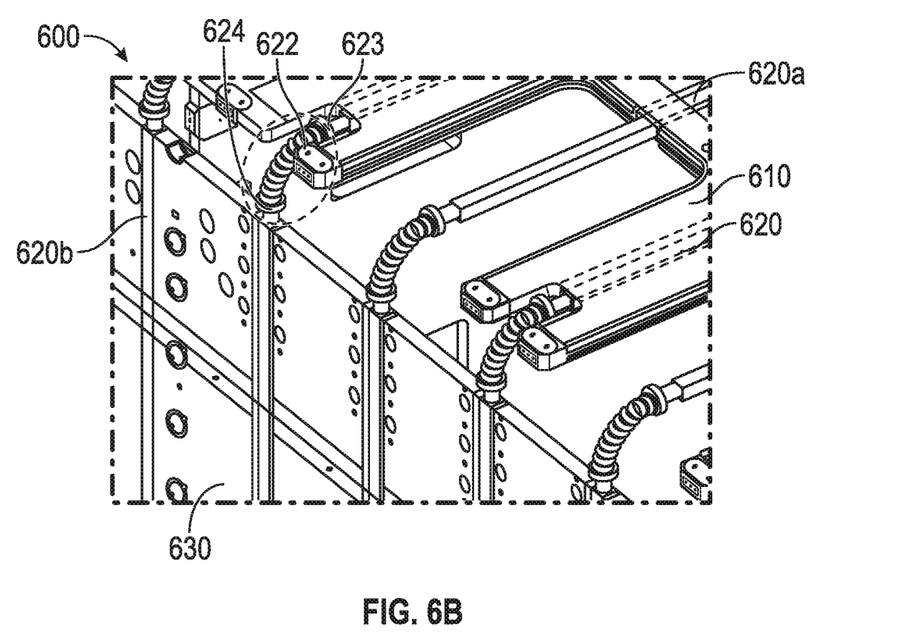
FIG. 6B is a perspective view of a panel assembly in a flight configuration, according to some embodiments of the present disclosure.

FIG. 6A is a perspective view of a panel assembly 600 in a flat configuration, according to some embodiments of the present disclosure. FIG. 6B is a perspective view of a panel assembly 600 in a flight configuration, according to some embodiments of the present disclosure. With reference to FIGS. 6A and 6B, the panel assembly 600 utilizes a heat pipe 620 that includes a compliant or flexible portion 622 to allow the movement, assembly, and heat transfer within the panel assembly 600.

In the depicted example, the flexible portion 622 of the heat pipe 620 is movable to permit heat transfer between the heat pipe 620, the payload panel 610 and/or the radiator panel 630. The flexible portion 622 is disposed between the payload portion 620a and the radiator portion 620b of the heat pipe 620, coupling the payload portion 620a and the radiator portion 620b of the heat pipe 620. The flexible portion 622 can be coupled to the payload portion 620a with a collar 623. Similarly, the flexible portion 622 can be coupled to the radiator portion 620b with a collar 624. As can be appreciated, the heat pipe 620, including the payload portion 620a, the radiator portion 620b, and the flexible portion 622 are formed as a continuous or integrated heat pipe.

As illustrated, a payload portion 620a of the heat pipe 620 is coupled to the payload panel 610. Similarly, the radiator portion 620b of the heat pipe 620 is coupled to the radiator panel 630. Advantageously, the payload portion 620a of the heat pipe 620 is movable independently of the radiator portion 620b of the heat pipe 620, allowing the payload portion 620a to be positioned relative to the payload panel 610 for optimal heat transfer without the limitations of a conventional rigid heat pipe. Similarly, the radiator portion 620b of the heat pipe 620 is movable independently of the payload portion 620a of the heat pipe 620, allowing the radiator portion 620b to be positioned relative to the radiator panel 630 for optimal heat transfer, simplifying manufacturing and testing. As can be appreciated, the heat pipes described herein can be moved to a flat configuration to allow for testing. In some embodiments, the flexible portion 622 can be moved or bent with forces less than those a generatable by a typical human satellite assembly technician or team of technicians.

After assembly, the flexible portion 622 of the heat pipe 620 is movable to allow the radiator panel 630 to move relative to the payload panel 610. As illustrated, the flexible portion 622 defines a bellowed portion. The bellows can define a plurality of radially outward extending convexly curved elements along the length of the flexible portion 622 which are connected to each other by concavely curved inner portions, i.e. individual bellows. In certain embodiments, the flexible portion 622 can include a surrounding braided sleeve. Embodiments of the flexible portion and the heat pipe generally can be described in U.S. Pat. No. 9,315,280, incorporated herein in its entirety.

Advantageously, the use of heat pipes with compliant portions can allow for more ease of manufacturing, efficient heat transfer, as well as the use of dimensionally larger movable radiator panels, enabling increased heat dissipation (in excess of 5000 Watts). Further, because the heat pipes described herein allow the radiator panel to move relative to the payload panel, a satellite can be built in a "flat" configuration and then assembled into a "folded" configuration. Similarly, testing and validation can be simplified. Additionally, the use of the heat pipes described herein can increase the configurability and hosting capabilities of the satellite.

Further, the use of heat pipes with compliant portions can reduce the mass, cost, and complexity of satellites by eliminating the need for release and deployment mechanisms. Further, by increasing heat transfer efficiency, smaller radiator panels can be used for a given dissipation requirement.

Figure 7:
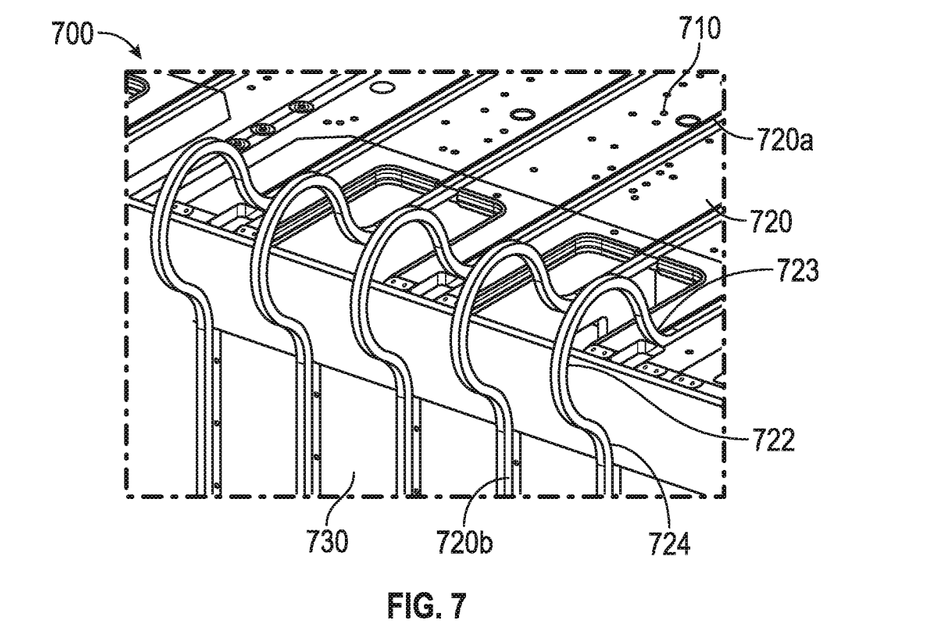
FIG. 7 is a perspective view of a panel assembly, according to some embodiments of the present disclosure.

FIG. 7 is a perspective view of a panel assembly 700, according to some embodiments of the present disclosure. In the depicted example, the panel assembly 700 utilizes a heat pipe 720 that includes a compliant or bent portion 722 to allow the movement, assembly, and heat transfer within the panel assembly 700.

In the depicted example, the bent portion 722 of the heat pipe 720 is movable to permit heat transfer between the heat pipe 720, the payload panel 710 and/or the radiator panel 730. The bent portion 722 is disposed between the payload portion 720a and the radiator portion 720b of the heat pipe 720, coupling the payload portion 720*a* and the radiator portion 720*b* of the heat pipe 720.

As illustrated, a payload portion 720*a* of the heat pipe 720 is coupled to the payload panel 710. Similarly, the radiator portion 720*b* of the heat pipe 720 is coupled to the radiator panel 730. Advantageously, the payload portion 720*a* of the heat pipe 720 is movable independently of the radiator portion 720*b* of the heat pipe 720, allowing the payload portion 720*a* to be positioned relative to the payload panel 710 for optimal heat transfer without the limitations of a conventional rigid heat pipe. Similarly, the radiator portion 720*b* of the heat pipe 720 is movable independently of the payload portion 720*a* of the heat pipe 720, allowing the radiator portion 720*b* to be positioned relative to the radiator panel 730 for optimal heat transfer.

After assembly, the bent portion 722 of the heat pipe 720 is movable to allow the radiator panel 730 to move relative to the payload panel 710. In the depicted example, the bent portion 722 defines a complex bend geometry to add compliance to the heat pipe 720. The bent portion 722 can include a first portion 723 that extends from the payload portion 720*a* and bends away from the radiator portion 720*b*. The second portion 724 can bend or arc toward the radiator portion 720*b*. The first portion 723 and the second portion 724 can increase the radius of the bent portion 722. In some embodiments the bent portion 722 can define an "omega" shaped bend. In some embodiments, the bent portion 722 can include bends in multiple planes.

Advantageously, heat pipes with bent portions can provide a simplified construction while providing compliance to the heat pipe. In some embodiments, heat pipes with bent portions can be moved or bent over small displacements to allow for alignment of thermal-mechanical bond line with a force of approximately 20 to 60 pounds per in.

Figure 8:
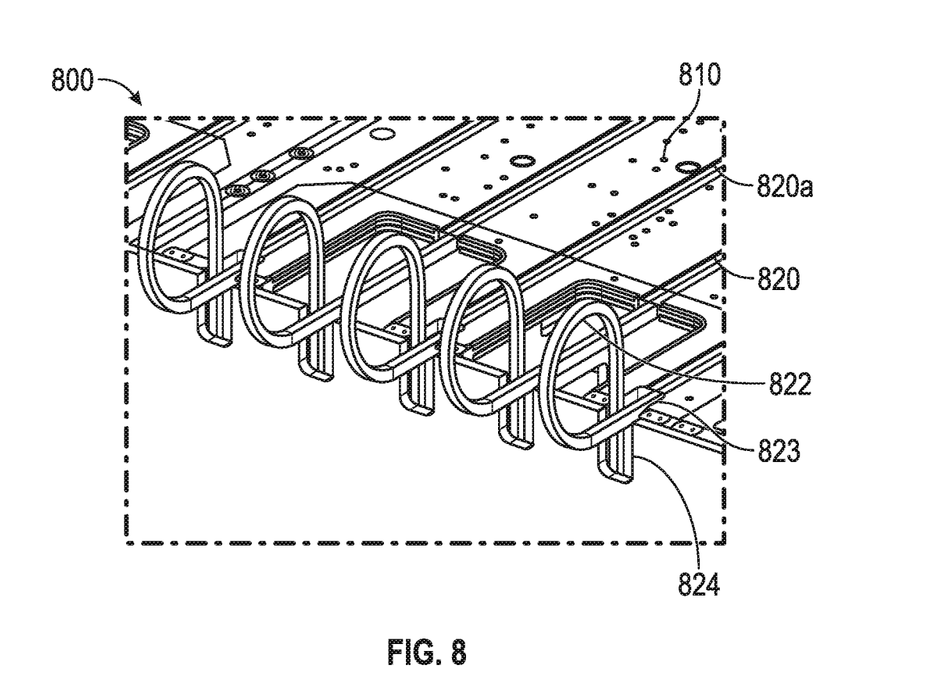
FIG. 8 is a perspective view of a panel assembly, according to some embodiments of the present disclosure.

FIG. 8 is a perspective view of a panel assembly 800, according to some embodiments of the present disclosure. In the depicted example, the panel assembly 800 depicts features that are similar to the features of panel assembly 700. Therefore, similar features of panel assembly 800 are identified with reference numerals that similar to the reference numerals that are used for features of panel assembly 700. As illustrated, the panel assembly 800 utilizes a heat pipe 820 that includes a compliant or looped portion 822 to allow the movement, assembly, and heat transfer within the panel assembly 800.

In the depicted example, the looped portion 822 defines a looped or partially looped geometry to add compliance to the heat pipe 820. The looped portion 822 can include a first portion 823 that extends from the payload portion 820*a* and away from the radiator portion 820*b*. The second portion 824 can loop back toward the radiator portion 820*b*. The first portion 823 and the second portion 824 can increase the length of the looped portion 822.

Figure 9:
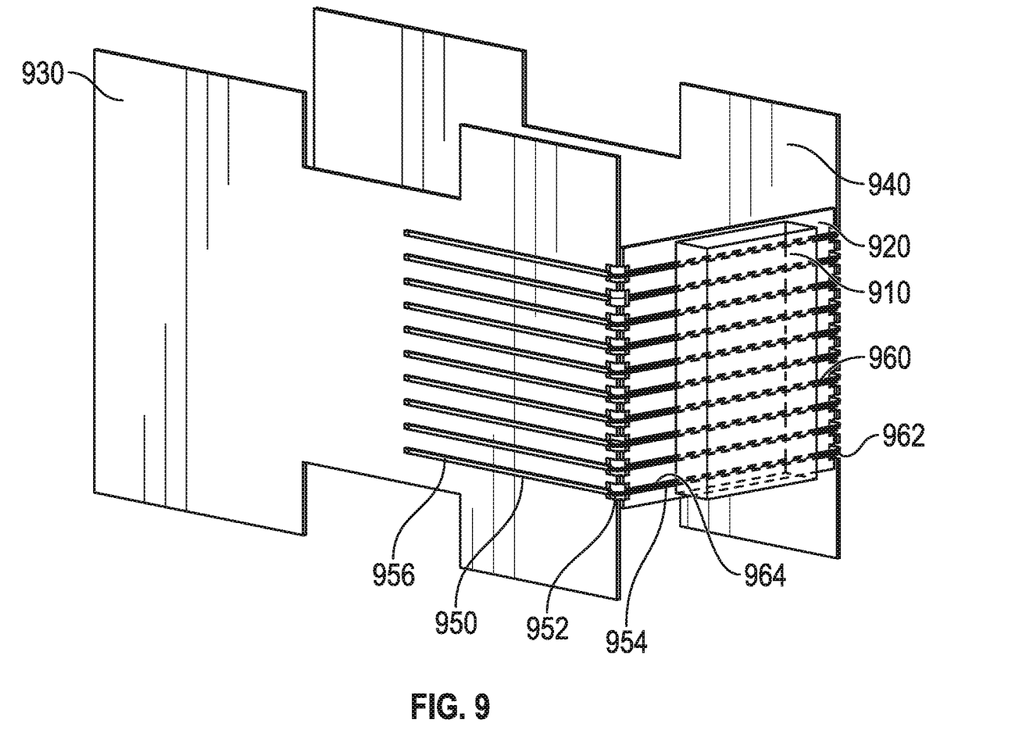
FIG. 9 is a perspective view of a panel assembly, according to some embodiments of the present disclosure.
Figure 10:
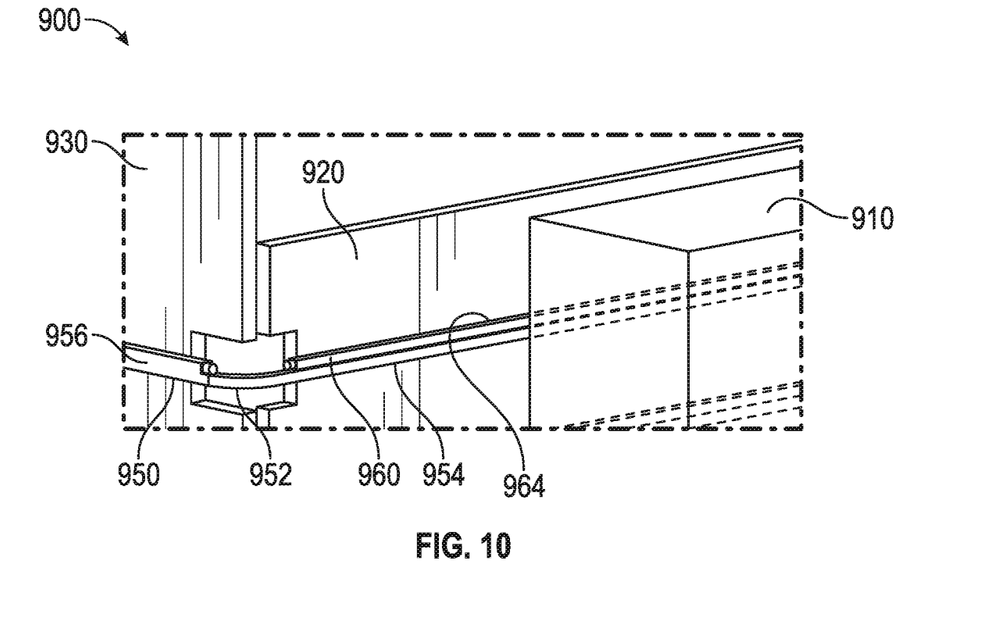
FIG. 10 is a detail view of the panel assembly of FIG. 9, according to some embodiments of the present disclosure.

FIG. 9 is a perspective view of a panel assembly 900, according to some embodiments of the present disclosure. FIG. 10 is a detail view of the panel assembly 900 of FIG. 9, according to some embodiments of the present disclosure. In the depicted example, the panel assembly 900 can distribute heat between a north radiator panel 930 and a south radiator panel 940.

As illustrated, a north radiator heat pipe 950 transfers heat from a payload 910 to the north radiator panel 930. In some embodiments, the payload 910 is coupled to the earth deck 920 of the panel assembly 900.

In some embodiments, a payload portion 954 of the north radiator heat pipe 950 is in thermal communication with the payload 910. The payload portion 954 can be affixed directly to the payload 910 and/or the earth deck 920. Similarly, a radiator portion 956 of the north radiator heat pipe 950 is in thermal communication with the north radiator panel 930. The radiator portion 956 can be affixed directly to the north radiator panel 930. As can be appreciated, a compliant portion 952 of the north radiator heat pipe 950 can facilitate relative movement of the payload portion 954 and the radiator portion 956 of the north radiator heat pipe 950, facilitating assembly and movement of the panel assembly 900. In the depicted example, the north radiator heat pipe 950 can have a generally "L" shape. In some embodiments, heat pipe 950 and or 960 may have a "U" shape, including two compliant sections, and run from the north radiator panel 930 through the earth deck 920 and through the south panel 940.

Similarly, a south radiator heat pipe 960 transfers heat from a payload 910 to the south radiator panel 940. In some embodiments, the payload 910 is coupled to the earth deck 920 of the panel assembly 900.

In some embodiments, a payload portion 964 of the south radiator heat pipe 960 is in thermal communication with the payload 910. The payload portion 964 can be affixed directly to the payload 910 and/or the earth deck 920. Similarly, a radiator portion 966 of the south radiator heat pipe 960 is in thermal communication with the south radiator panel 940. The radiator portion 966 can be affixed directly to the south radiator panel 940. As can be appreciated, a compliant portion 962 of the south radiator heat pipe 960 can facilitate relative movement of the payload portion 964 and the radiator portion 966 of the south radiator heat pipe 960, facilitating assembly and movement of the panel assembly 900. The south radiator heat pipe 960 can have a generally "L" shape.

During operation, heat can be distributed between the north radiator heat pipe 950 and the south radiator heat pipe 960. In some embodiments, the north radiator heat pipe 950 and the south radiator heat pipe 960 are in thermal communication to transfer heat therebetween. As illustrated, the payload portion 954 of the north radiator heat pipe 950 can be in thermal communication with the payload portion 964 of the south radiator heat pipe 960. The payload portion 954 can be in direct contact with the payload portion 964. In some embodiments, the payload portion 954 is affixed to the payload portion 964. During operation, differences in temperature between the north radiator heat pipe 950 and the south radiator heat pipe 960 can be equalized, causing heat to flow to the radiator panel with the greatest available thermal capacity. Advantageously, by allowing heat transfer between the north radiator heat pipe 950 and the south radiator heat pipe 960, waste heat can be distributed between the north radiator panel 930 and the south radiator panel 940, permitting the panel assembly 900 to dissipate waste heat efficiently, based on panel capacity and solar loads.

Figure 11:
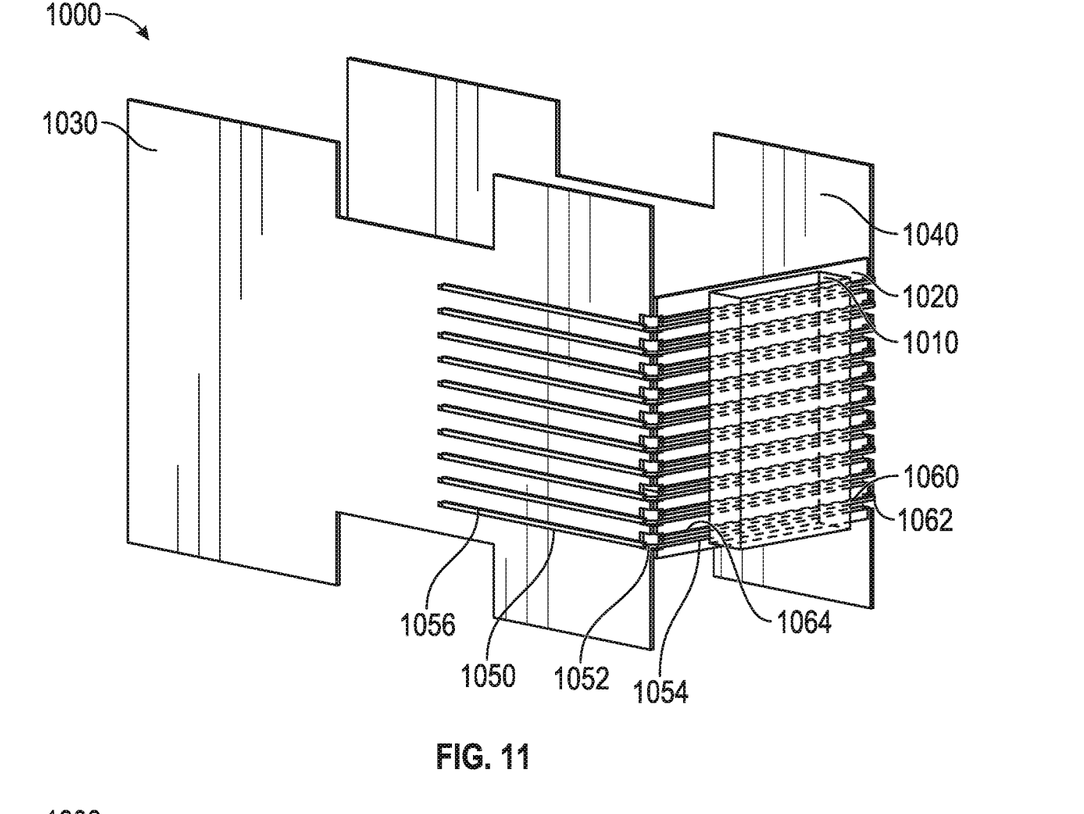
FIG. 11 is a perspective view of a panel assembly, according to some embodiments of the present disclosure.
Figure 12:
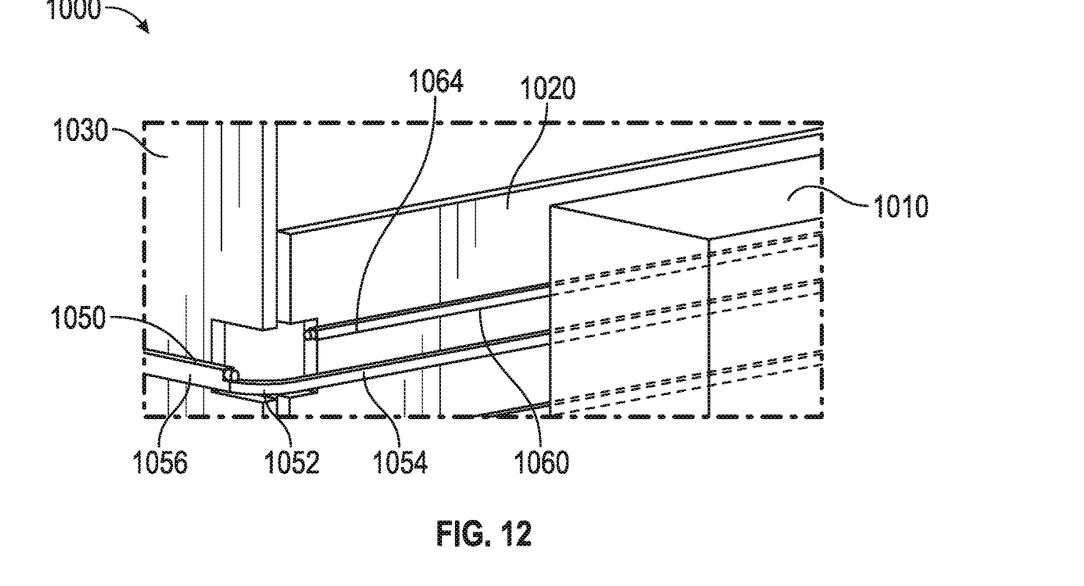
FIG. 12 is a detail view of the panel assembly of FIG. 11, according to some embodiments of the present disclosure

FIG. 11 is a perspective view of a panel assembly 1000, according to some embodiments of the present disclosure. FIG. 12 is a detail view of the panel assembly 1000 of FIG. 11, according to some embodiments of the present disclosure. With reference to FIGS. 11 and 12, the panel assembly 1000 depicts features that are similar to the features of panel assembly 900. Therefore, similar features of panel assembly 1000 are identified with reference numerals that similar to the reference numerals that are used for features of panel assembly 900. In the depicted example, the panel assembly 1000 can distribute heat between a north radiator panel 1030 and a south radiator panel 1040 via a payload panel 1020.

During operation, heat can be distributed between the north radiator heat pipe 1050 and the south radiator heat pipe 1060. In some embodiments, the north radiator heat pipe 1050 and the south radiator heat pipe 1060 are in thermal communication to transfer heat therebetween. As illustrated, the payload portion 1054 of the north radiator heat pipe 1050 can be in thermal communication with the payload portion 1064 of the south radiator heat pipe 1060. The payload portion 1054 can be spaced apart from the payload portion 1064. During operation, heat pipes described herein can be used as a conduction path to transfer heat between the payload portion 1054 and the payload portion 1064. During operation, differences in temperature between the north radiator heat pipe 1050 and the south radiator heat pipe 1060 will tend toward equalization, causing heat to flow to the radiator panel with the greatest available unsued thermal capacity or lowest temperature. Advantageously, by allowing heat transfer between the north radiator heat pipe 1050 and the south radiator heat pipe 1060, waste heat can be distributed between the north radiator panel 1030 and the south radiator panel 1040, permitting the panel assembly 1000 to dissipate waste heat efficiently, based on panel capacity and solar loads.

Figure 13:
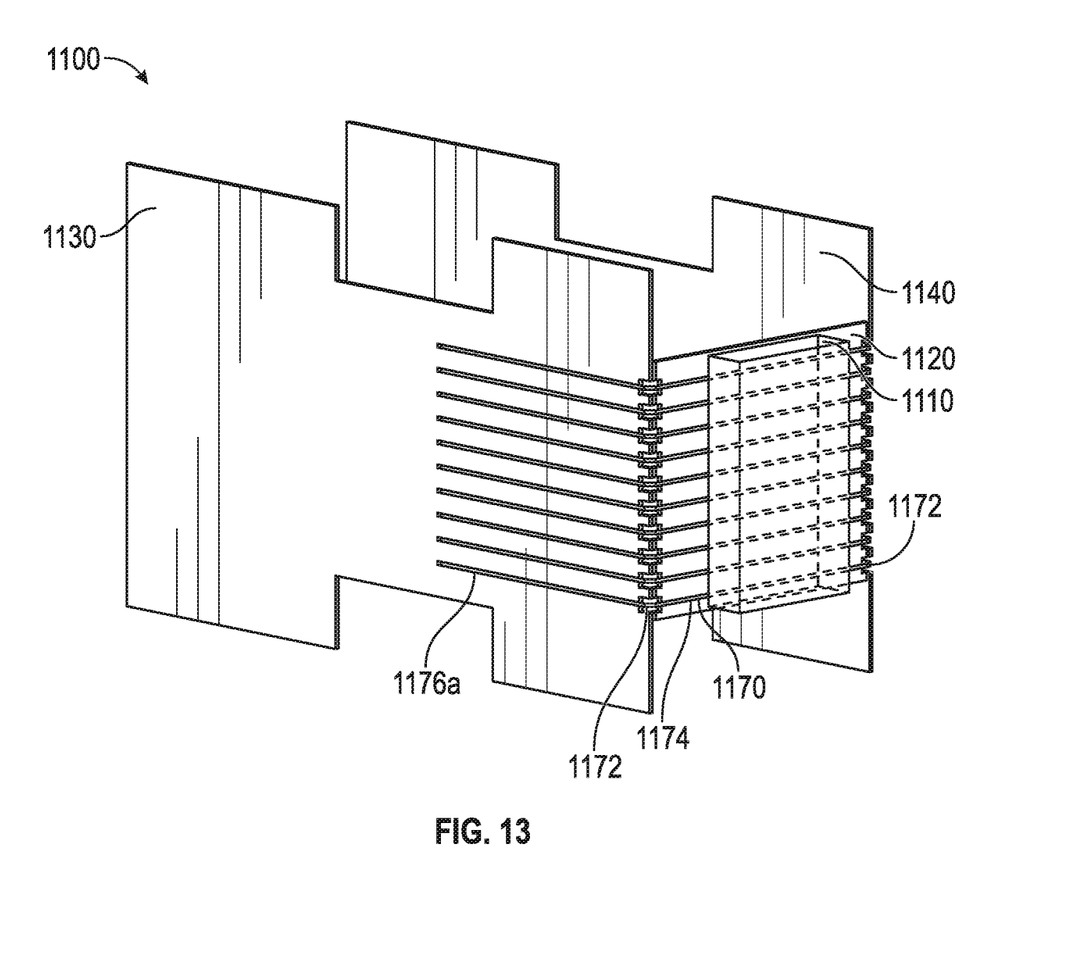
FIG. 13 is a perspective view of a panel assembly, according to some embodiments of the present disclosure.

FIG. 13 is a perspective view of a panel assembly 1100, according to some embodiments of the present disclosure. In the depicted example, the panel assembly 1100 can distribute heat between a north radiator panel 1130 and a south radiator panel 1140.

As illustrated, a common heat pipe 1170 transfers heat from a payload 1110 to the north radiator panel 1130 and to the south radiator panel 1140. In some embodiments, the payload 1110 is coupled to the earth deck 1120 of the panel assembly 1100.

In some embodiments, a payload portion 1174 of the common heat pipe 1170 is in thermal communication with the payload 1110. The payload portion 1174 can be affixed directly to the payload 1110 and/or the earth deck 1120.

In some embodiments, a north radiator portion 1176a of the common heat pipe 1170 is in thermal communication with the north radiator panel 1130. The north radiator portion 1176a can be affixed directly to the north radiator panel 1130. As can be appreciated, a compliant portion 1172 of the common heat pipe 1170 can facilitate relative movement of the payload portion 1174 and the north radiator portion 1176a of the common heat pipe 1170, facilitating assembly and movement of the panel assembly 1100.

Similarly, a south radiator portion (not shown) of the common heat pipe 1170 is in thermal communication with the south radiator panel 1140. The south radiator portion can be affixed directly to the south radiator panel 1140. As can be appreciated, a compliant portion 1172 of the common heat pipe 1170 can facilitate relative movement of the payload portion 1174 and the south radiator portion of the common heat pipe 1170, facilitating assembly and movement of the panel assembly 1100. The common heat pipe 1170 can have a generally "U" shape.

During operation, heat can be distributed across the common heat pipe 1170. During operation, differences in temperature between the north radiator portion 1176a and the south radiator portion can be equalized, causing heat to flow to the radiator panel with the greatest available thermal capacity. Advantageously, by allowing heat transfer between the north radiator portion 1176a and the south radiator portion, waste heat can be distributed between the north radiator panel 1130 and the south radiator panel 1140, permitting the panel assembly 1100 to dissipate waste heat efficiently, based on panel capacity and solar loads.

Figure 14:
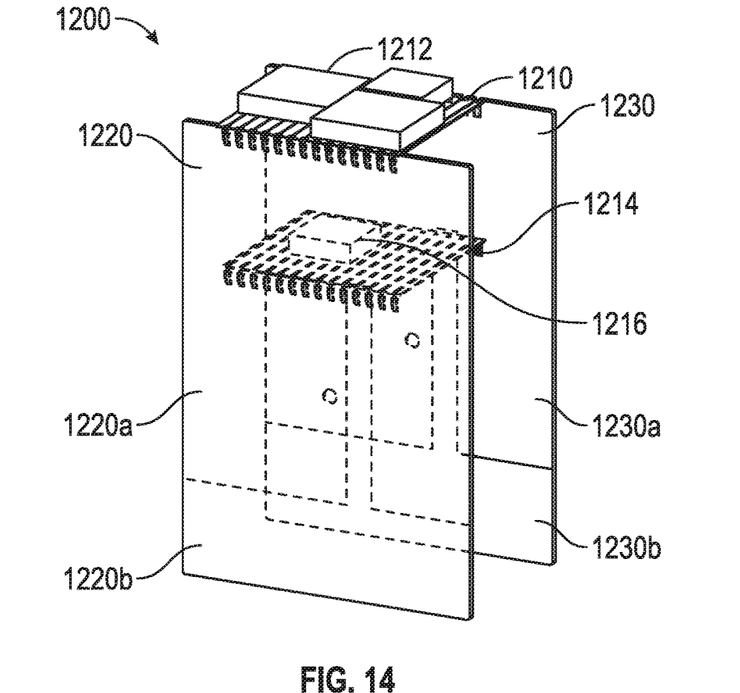
FIG. 14 is a perspective view of a panel assembly, according to some embodiments of the present disclosure.

FIG. 14 is a perspective view of a panel assembly 1200, according to some embodiments of the present disclosure.

Figure 15:
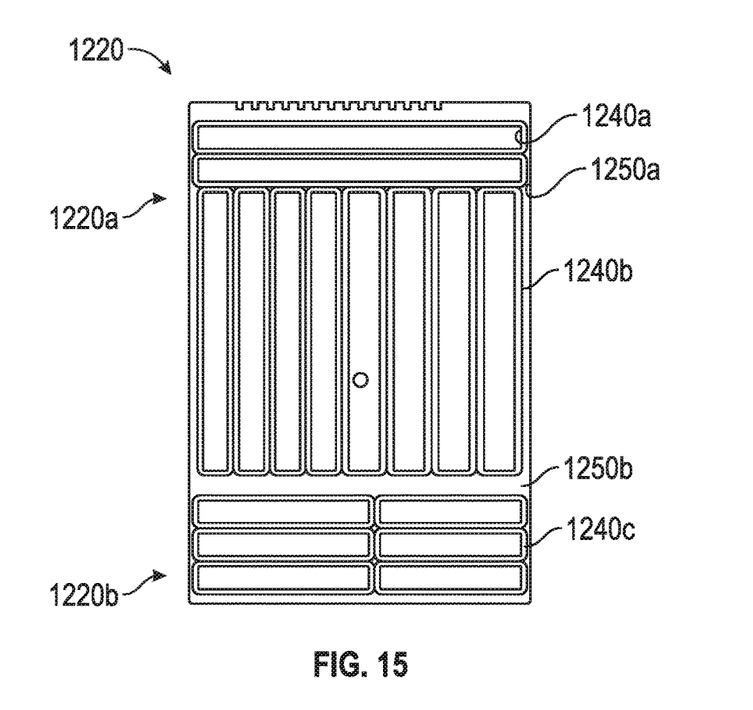
FIG. 15 is a front elevation view of a panel of the panel assembly of FIG. 14, according to some embodiments of the present disclosure.

FIG. 15 is a front elevation view of a north radiator panel 1220 of the panel assembly 1200 of FIG. 14, according to some embodiments of the present disclosure. In the depicted example, the panel assembly 1200 allows for isolated cooling of various components of the panel assembly 1200.

During operation, payloads 1212 can generate waste heat that is dissipated by the panel assembly 1200. As illustrated, heat pipes coupled to, or otherwise associated with a payload panel 1210 can transfer heat to the north radiator panel 1220 and/or the south radiator panel 1230.

As illustrated with respect to the north radiator panel 1220, heat from the payloads 1212 can be distributed and/or transferred within the north radiator panel 1220 by heat pipes in thermal communication with the north radiator panel 1220. As can be appreciated, the south radiator panel 1230 can have a similar configuration. In some embodiments, a first payload heat pipe network 1240a can distribute the heat from the payloads 1212 within a first radiator panel area 1250a. The first payload heat pipe network 1240a can be embedded within the north radiator panel 1220 or coupled to the north radiator panel 1220. Optionally, the first payload heat pipe network 1240a can have heat pipe loops that run in a generally latitudinal direction, distributing the heat from the payloads 1212 in a generally latitudinal direction.

In some embodiments, the panel assembly 1200 can further include secondary payloads 1216, that also generate waste heat that is dissipated by the panel assembly 1200. As illustrated, heat pipes coupled to, or otherwise associated with a payload panel 1214 can transfer heat to the north radiator panel 1220 and/or the south radiator panel 1230.

As illustrated with respect to the north radiator panel 1220, heat from the secondary payloads 1216 can be distributed and/or transferred within the north radiator panel 1220 by heat pipes in thermal communication with the north radiator panel 1220. In some embodiments, a second payload heat pipe network 1240b can distribute the heat from the secondary payloads 1216 within a first radiator panel area 1250a. The second payload heat pipe network 1240b can be embedded within the north radiator panel 1220 or coupled to the north radiator panel 1220. Optionally, the second payload heat pipe network 1240b can have heat pipe loops that run in a generally longitudinal direction, distributing the heat from the payloads 1216 in a generally longitudinal direction.

In some embodiments, the first payload heat pipe network 1240a can transfer heat to a second payload heat pipe network 1240b to further distribute heat from the payloads 1212 and secondary payloads 1216 within a first radiator panel area 1250a. As illustrated, the second payload heat pipe network 1240b can be abutted to, in proximity to, or otherwise in thermal communication with the first payload heat pipe network 1240a to transfer heat therebetween. In some embodiments, the end portions of the second payload heat pipe network 1240b can be abutted with the length portions of the first payload heat pipe network 1240a to transfer heat therewithin.

Optionally, a second radiator panel area 1250b can be thermally isolated from the first radiator panel area 1250a. In the depicted example, the second radiator panel area 1250b includes an isolated heat pipe network 1240c. In some embodiments, the isolated heat pipe network 1240c can distribute the heat within a second radiator panel area 1250b. The second radiator panel area 1250b can be thermally isolated from the first radiator panel area 1250a by spacing the second radiator panel area 1250b with a minimally thermally conductive material. Advantageously, the isolated heat pipe network 1240c can be used to thermally isolate sensitive components or components that have different thermal requirements.

Terms such as "top," "bottom," "front," "rear", "above", and "below" and the like as used in this disclosure should be understood as referring to an arbitrary frame of reference, rather than to the ordinary gravitational frame of reference. Thus, a top surface, a bottom surface, a front surface, and a rear surface may extend upwardly, downwardly, diagonally, or horizontally in a gravitational frame of reference.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. A phrase such an embodiment may refer to one or more embodiments and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A panel assembly for use with a spacecraft, the panel assembly comprising:
   a payload panel configured to generate waste heat during operation;
   a radiator panel spaced apart from the payload, wherein the radiator panel is configured to dissipate the waste heat; and
   a heat pipe configured to transfer the waste heat from the payload panel to the radiator panel, the heat pipe comprising:
      a payload portion coupled to the payload;
      a first collar that couples the payload portion to the payload panel;
      a radiator portion coupled to the radiator panel;
      a second collar that couples the radiator portion to the radiator panel; and
      a flexible portion configured to permit i) the radiator panel to move relative to the payload panel and i) the payload panel to move relative to the radiator panel.

2. The panel assembly of claim 1, wherein the flexible portion is disposed between the first collar and the second collar.

3. The panel assembly of claim 2, wherein the flexible portion comprises a flexible joint configured to permit the radiator portion to move relative to the payload portion.

4. The panel assembly of claim 2, wherein the flexible portion comprises a bent portion configured to permit the radiator portion to move relative to the payload portion.

5. The panel assembly of claim 1, wherein the radiator panel is part of a plurality of radiator panels.

6. The panel assembly of claim 5, wherein each radiator panel of the plurality of radiator panels is movably coupled to a baseplate.

7. The panel assembly of claim 5, wherein the heat pipe is coupled to each radiator panel of the plurality of radiator panels and the heat pipe transfers heat between the plurality of radiator panels.

8. The panel assembly of claim 5, wherein the heat pipe is part of a plurality of heat pipes.

9. The panel assembly of claim 8, wherein a first heat pipe of the plurality of heat pipes is coupled to the payload and a first radiator panel of the plurality of radiator panels, and a second heat pipe of the plurality of heat pipes is coupled to the payload and a second radiator panel of the plurality of radiator panels.

10. The panel assembly of claim 9, wherein the first heat pipe is in thermal communication with the second heat pipe to transfer heat between the first radiator panel and the second radiator panel.

11. A spacecraft, comprising:
    an electronically steered antenna configured to generate waste heat during operation; and
    a panel assembly, comprising:
       a plurality of radiator panels spaced apart from the electronically steered antenna, wherein the plurality of radiator panels are configured to dissipate the waste heat from the electronically steered antenna; and
       at least one heat pipe coupled to the electronically steered antenna and each of the plurality of radiator panels, the at least one heat pipe comprising:
          a plurality of flexible portions to permit the plurality of radiator panels to move relative to the electronically steered antenna; and
          a plurality of collars that couple the plurality of flexible portions to the electronically steered antenna and the plurality of radiator panels, wherein the at least one heat pipe is configured to transfer waste heat from the electronically steered antenna to the plurality of radiator panels.

12. The spacecraft of claim 11, wherein each flexible portion of the plurality of flexible portions is located between a pair of collars of the plurality of collars.

13. The spacecraft of claim 11, wherein the at least one heat pipe comprises a plurality of heat pipes, wherein each heat pipe of the plurality of heat pipes is coupled to the electronically steered antenna and a respective radiator panel of the plurality of radiator panels.

14. The spacecraft of claim 13, wherein each heat pipe of the plurality of heat pipes transfers heat to other heat pipes of the plurality of heat pipes.

* * * * *